United States Patent
Sawaguchi et al.

(10) Patent No.: US 7,019,095 B2
(45) Date of Patent: Mar. 28, 2006

(54) ETHYLENE-VINYL ALCOHOL COPOLYMER AND PROCESS FOR PRODUCING THE SAME

(75) Inventors: Takashi Sawaguchi, Tokyo (JP); Shoichiro Yano, Tokyo (JP); Toshiki Hagiwara, Tokyo (JP); Yoshihiro Chishima, Tateyama (JP); Yuko Akutsu, Tokyo (JP)

(73) Assignee: Nihon University, School Juridical Person, Tokyo (JP)

( * ) Notice: Subject to any disclaimer, the term of this patent is extended or adjusted under 35 U.S.C. 154(b) by 73 days.

(21) Appl. No.: 10/487,211

(22) PCT Filed: Aug. 20, 2002

(86) PCT No.: PCT/JP02/08381

§ 371 (c)(1),
(2), (4) Date: May 19, 2004

(87) PCT Pub. No.: WO03/016360

PCT Pub. Date: Feb. 27, 2003

(65) Prior Publication Data

US 2004/0204550 A1  Oct. 14, 2004

(30) Foreign Application Priority Data

Aug. 21, 2001 (JP) ............................ 2001-250023
May 1, 2002 (JP) ............................ 2002-129592

(51) Int. Cl.
*C08F 136/06* (2006.01)
*C08F 36/06* (2006.01)

(52) U.S. Cl. .................... 526/335; 526/307.5; 526/352
(58) Field of Classification Search ................ 526/335, 526/307.5, 352
See application file for complete search history.

(56) References Cited

U.S. PATENT DOCUMENTS

| 3,042,661 A | * | 7/1962 | Kirshenbaum et al. .. 525/332.8 |
| 3,312,744 A | * | 4/1967 | Farr, Jr. et al. ............. 568/852 |
| 3,520,865 A | | 7/1970 | Pampus |
| 3,864,324 A | * | 2/1975 | Yukuta et al. ............... 525/361 |
| 6,031,052 A | | 2/2000 | Webb |

FOREIGN PATENT DOCUMENTS

| GB | 711 512 | * | 7/1954 |
| GB | 711 512 A | | 7/1954 |
| JP | 40-013677 A | | 7/1940 |
| JP | 49-034592 A | | 3/1974 |
| JP | 01 132604 A | | 5/1989 |

* cited by examiner

*Primary Examiner*—Ling-Sui Choi
(74) *Attorney, Agent, or Firm*—Birch, Stewart, Kolasch & Birch, LLP (57) ABSTRACT

An ethylene-vinyl alcohol copolymer, represented by the formula (1):

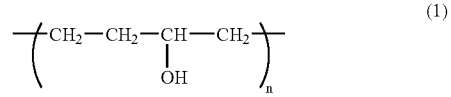

wherein n represents a number in the range of 15 to 15,000, and a method of producing an ethylene-vinyl alcohol copolymer wherein an 1,4-polybutadiene is hydroborated in non-gel state in a solvent, followed by oxidation to be hydroxylated so as to derive an ethylene-vinyl alcohol copolymer represented by the formula (1):

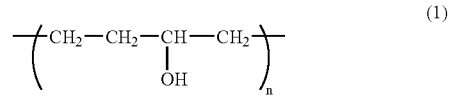

wherein n represents a number in the range of 15 to 15,000.

5 Claims, 10 Drawing Sheets

ETHYLENE-VINYL ALCOHOL COPOLYMER AND PROCESS FOR PRODUCING THE SAME

TECHNICAL FIELD

The present invention relates to an ethylene-vinyl alcohol copolymer and a method of producing the same.

BACKGROUND ART

Conventionally, as a wrapping material for a food product and other products, or an adhesive material, a polymer produced by incorporating a hydrophilic monomer with a hydrophobic α-olefin polymer has been used. For example, an ethylene-vinyl alcohol copolymer (EVOH) produced by copolymerizing vinyl acetate and ethylene followed by hydrolysis is known. The copolymer is rich in hydrophilicity and biodegradability.

However, such a polymer is produced by the random polymerization of an α-olefin and vinyl alcohol, and thus the one produced by the alternating copolymerization of an α-olefin and vinyl alcohol with a precise ratio of 1:1 has not been derived until now.

DISCLOSURE OF THE INVENTION

An object of the present invention is to provide an ethylene-vinyl alcohol copolymer having a novel structure which is produced by completely and alternately copolymerizing ethylene and vinyl alcohol, and a method of producing the same.

The present inventors were devoted to studying to derive a complete alternating copolymer of ethylene and vinyl alcohol. Consequently, particular reaction conditions for approximately completely hydroxylating an 1,4-polybutadiene have been founded, and the present invention has been accomplished based upon such information.

That is, an ethylene-vinyl alcohol copolymer with respect to the present invention is derived by approximately completely hydroxylating an 1,4-polybutadiene. The structure of the ethylene-vinyl alcohol copolymer is represented by the formula (1):

(1)

wherein n is a number in the range of 15 to 15,000.

An ethylene-vinyl alcohol copolymer of the present invention may be the one derived by approximately completely hydroxylating a cis-1,4-polybutadiene, or the one derived by approximately completely hydroxylating a trans-1,4-polybutadiene.

These copolymers have the same structure as the one represented by the formula (1). However, they are different from each other in physical properties and chemical properties. Thus they are a different polymer from each other. Here, the wording "approximately completely" means that 99% or more of double bonds in 1,4-polybutadiene has been hydroxylated.

A method of producing an ethylene-vinyl alcohol copolymer with respect to the present invention is the one using an 1,4-polybutadiene as a raw material, wherein the 1,4-polybutadiene is hydroborated in a solvent, followed by oxidation to be hydroxylated, characterized in that the hydroboration is carried out in a condition in which the solution of the 1,4-polybutadiene is in non-gel state.

BEST MODE FOR CARRYING OUT THE INVENTION

The present invention will be hereinafter explained in detail with reference to modes for carrying out the invention.

Ethylene-Vinyl Alcohol Copolymer

An ethylene-vinyl alcohol copolymer with respect to the present invention has a novel structure represented by the formula (1):

(1)

wherein n is a number in the range of 15 to 15,000.

The intramolecular micro-stereostructure of an ethylene-vinyl alcohol copolymer with respect to the present invention is not limited at all. Specifically, the ethylene-vinyl alcohol copolymer includes a copolymer (which may be hereinafter referred to as "a cisPBD-OH") derived when a cis-1,4-polybutadiene (which may be hereinafter referred to as "a cisPBD") is used as a raw material. The intramolecular micro-stereostructure of such an ethylene-vinyl alcohol copolymer is determined according to a reaction mechanism wherein a cis-1,4-polybutadiene as a raw material is hydroborated, followed by oxidation to be hydroxylated. Similarly, the ethylene-vinyl alcohol copolymer includes a copolymer (which may be hereinafter referred to as "a transPBD-OH") derived when a trans-1,4-polybutadiene (which may be hereinafter referred to as "a transPBD") is used as a raw material. The intramolecular micro-stereostructure of such an ethylene-vinyl alcohol copolymer is determined according to a reaction mechanism wherein a trans-1,4-polybutadiene as a raw material is hydroborated, followed by oxidation to be hydroxylated.

(Production Method)

In a method of producing an ethylene-vinyl alcohol copolymer with respect to the present invention, an 1,4-polybutadiene is used as a raw material. The 1,4-polybutadiene may be a synthetic or a natural product. The molecular weight of the polybutadiene is not particularly limited, provided that the number of repetitions of the monomer unit is in the range of 15 to 15,000.

Such an 1,4-polybutadiene is hydroborated commonly with a publicly known reagent for hydroboration, followed by oxidation to be hydroxylated. It is ease for a finally derived ethylene-vinyl alcohol copolymer to be put into water to be precipitated, and the precipitate is sufficiently washed, followed by the filtration and recovery.

In a method with respect to the present invention, it is particularly important to select such conditions that when an 1,4-polybutadiene as a raw material is hydroborated, a solution of the 1,4-polybutadiene is not in gel state, (that is, non-gel state). Here, the wording "gel state" means a state in which when a reagent for hydroboration is added to a solution of an 1,4-polybutadiene, double bonds of a part of the 1,4-polybutadiene are hydroborated, while the solution becomes in gel state due to a crosslinking reaction, and consequently it has already become difficult for the hydroboration reagent sufficiently to reach the rest double-bond sites of the 1,4-polybutadiene. Accordingly, in such a case, the hydroboration is substantially stopped. As a result, the 1,4-polybutadiene is incompletely hydroborated.

In the present invention, in order to prevent the gelation of an 1,4-polybutadiene solution due to a reaction of such a reagent for hydroboration and double-bond sites of the 1,4-polybutadiene, it is preferred (i) to lower the concentration of an 1,4-polybutadiene as a raw material in a solvent as compared to a specific concentration, and (ii) to control a reaction temperature so as to cause no gelation during the reaction.

When the solvent is tetrahydrofuran (THF), the concentration of an 1,4-polybutadiene as a raw material is preferably 5 w/v % (weight % of the 1,4-polybutadiene based on the volume of the solvent; the same rule applies to the following) or less.

As hydroboration reagents used in the present invention, a borane complex, a monoalkyl borane, a dialkyl borane, and the like can be enumerated. THF-complex of $BH_3$ is preferred. A reaction temperature for hydroboration is 55° C. or more, preferably 60° C. or more, and in particular preferably 70° C. or more. When the solvent is THF, a reflux near the boiling point is preferred. The reaction time is a period of one hour or more, and preferably five hours or more.

In the present invention, a hydroboration reagent having a structure due to which no crosslinking is caused may be used. As such a non-crosslinking hydroboration reagent, a conventionally known monofunctional one (which is the one having only one BH-group in its molecule) may be selected, and for example, 9-borabicyclo[3.3.1]nonane can be enumerated. In this case, it is difficult to make the solution gelled, and the solution can be reacted at a higher concentration. Specifically, when THF is used as a solvent, an 1,4-polybutadiene as a raw material may be used at a concentration of about 3%.

In the present invention, the amount of a hydroboration reagent to be used is preferably 1–1.5 equivalent amounts, provided that when one BH-group is reacted with one double-bond of an 1,4-polybutadiene, the amount is one equivalent amount.

EXAMPLES

The present invention will be hereinafter more particularly explained by way of examples, but the present invention is not limited to these examples at all. Incidentally, in the present examples, the following abbreviations are used:
(1) cisPBD: cis-1,4-polybutadiene;
(2) BTC: borane-THF complex/THF solution;
(3) 9BBN: 9-borabicyclo[3.3.1]nonane/THF solution;
(4) cisPBD-OH(BTC): ethylene-vinyl alcohol copolymer as derived by hydroborating a cis-1,4-polybutadiene with BTC, followed by oxidation;
(5) cisPBD-OH(9BBN) [slow cooling]: ethylene-vinyl alcohol copolymer as derived by hydroborating a cis-1,4-polybutadiene with 9BBN, oxidizing the same, and heat-pressing the derived product to shape, followed by slow cooling; and
(6) cisPBD-OH(9BBN) [quenching]: ethylene-vinyl alcohol copolymer as derived by hydroborating a cis-1,4-polybutadiene with 9BBN, oxidizing the same, and heat-pressing the derived product to shape, followed by quenching.

In the present examples, the following devices and conditions were used for structural analysis and physical properties evaluation:
(1) $^1$H-NMR: AL400 MHz-NMR spectrometer (with resonance frequency of 399.65 MHz) of JEOL Ltd. make was used. A cisPBD was measured at a temperature of 24° C. in deuterated chloroform. A cisPBD-OH was measured at a temperature of 60° C. in deuterated methanol.
(2) $^{13}$C-NMR: ECP500 MHz-NMR spectrometer (with resonance frequency of 500.16 MHz) of JEOL Ltd. make was used. A cisPBD-OH was measured at a temperature of 60° C. in dense methanol.
(3) IR: 1600-FT-IR infrared-spectrometer of Perkin-Elmer Inc. make was used. A cisPBD and a cisPBD-OH were measured according to KBr-method.
(4) DMA: DVA220 Dynamic-Viscoelasticity Measuring Equipment of IT Manufacture Control K.K. make was used. Measured with a sample size of 30 mm×5 mm and a grip width of 20 mm, at a temperature rising rate of 5° C./min, a frequency of 10 Hz, and tension mode.
(5) DSC: DSC6100 Differential Scanning Calorimeter of Seiko Instruments Inc. make was used. Measured at a temperature rising rate of 10° C./min in a nitrogen flow (of 100 ml/min).
(6) TG: TG/DTA6200 Calorimeter of Seiko Instruments Inc. make was used. Measured at a temperature rising rate of 10° C./min in a air flow (of 100 ml/min).
(7) Wide-Angle X-ray Diffraction: Rotating-Anode Type RINT-2500V of RIGAKU Corporation make was used. Measured at room temperature (19° C.).
(8) Stress-Strain Test: Model IM-20 of INTESCO Co., Ltd. make was used. Measured with a load cell of LCT-100MN, at a tension speed of 10 cm/min and room temperature (19° C.).

(9) High Temperature GPC: HLC-8121GPC/HT High-Temperature Gel Permeation Chromatography of Tosoh Corporation make was used. Measured at a sample concentration of 0.1 w/v % in a solvent of o-dichlorobenzene, at a measuring temperature of 145° C. and at a flow rate of 1000 µl/min.

Incidentally, in the present examples, an commercially available cisPBD as a raw material was used as it is. The weight-average molecular weight (Mw) and the degree of dispersion (Mw/Mn) which were determined by means of high-temperature GPC were $2.0 \times 10^5$ and 2.2, respectively. With respect to the molecular structure of the cisPBD, it was confirmed by means of $^1$H-NMR that 97% of the cisPBD is 1,4-additional one.

Experiment 1

To a deaerated and $N_2$-replaced four-neck flask, a solution of 3.0 g of the cisPBD in 100.0 ml of a distilled THF, and 17.1 ml of BTC (1.08 mol/liter) were added, followed by hydroboration while agitated at 70° C. for a period of 5 hours.

Subsequently, the reaction mixture was cooled to a temperature of 0° C., and 29.6 ml of 5N-NaOH, 7.5 ml of methanol, and 20.0 ml of $H_2O_2$ were added thereto, followed by oxidation with agitation at 40° C. for a period of 15 hours.

After the reaction, water was added in an amount of four times of the one of the above THF to the derived reaction mixture while the mixture was agitated. The resultant white precipitate was filtered and recovered, followed by water washing.

Experiment 2

To a deaerated and $N_2$-replaced four-neck flask, a solution of 0.3 g of the cisPBD in 100.0 ml of a distilled THF, and 1.7 ml of BTC (1.08 mol/liter) were added, followed by hydroboration while agitated at 70° C. for a period of 24 hours.

Subsequently, the reaction mixture was cooled to a temperature of 0° C., and 3.0 ml of 5N-NaOH, 0.8 ml of methanol, and 2.0 ml of $H_2O_2$ were added thereto, followed by oxidation with agitation at 40° C. for a period of 15 hours.

After the reaction, water was added in an amount of four times of the one of the above THF to the derived reaction mixture while the mixture was agitated. The resultant white precipitate was filtered and recovered, followed by water washing.

Experiment 3

To a deaerated and $N_2$-replaced four-neck flask, a solution of 0.3 g of the cisPBD in 100.0 ml of a distilled THF, and 5.1 ml of BTC (1.08 mol/liter) were added, followed by hydroboration while agitated at 70° C. for a period of 5 hours.

Subsequently, the reaction mixture was cooled to a temperature of 0° C., and 8.9 ml of 5N-NaOH, 2.2 ml of methanol, and 6.0 ml of $H_2O_2$ were added thereto, followed by oxidation with agitation at 40° C. for a period of 15 hours.

After the reaction, water was added in an amount of four times of the one of the above THF to the derived reaction mixture while the mixture was agitated. The resultant white precipitate was filtered and recovered, followed by water washing.

Experiment 4

To a deaerated and $N_2$-replaced four-neck flask, a solution of 0.3 g of the cisPBD in 100.0 ml of a distilled THF, and 10.3 ml of BTC (1.08 mol/liter) were added, followed by hydroboration while agitated at 70° C. for a period of 5 hours.

Subsequently, the reaction mixture was cooled to a temperature of 0° C., and 17.7 ml of 5N-NaOH, 4.5 ml of methanol, and 12.0 ml of $H_2O_2$ were added thereto, followed by oxidation with agitation at 40° C. for a period of 15 hours.

After the reaction, water was added in an amount of four times of the one of the above THF to the derived reaction mixture while the mixture was agitated. The resultant white precipitate was filtered and recovered, followed by water washing.

Experiment 5

To a deaerated and $N_2$-replaced four-neck flask, a solution of 1.0 g of the cisPBD in 100.0 ml of a distilled THF, and 53.3 ml of 9BBN (0.50 mol/liter) were added, followed by hydroboration while agitated at 55° C. for a period of 5 hours.

Subsequently, the reaction mixture was cooled to a temperature of 0° C., and 23.4 ml of 5N-NaOH, 6.0 ml of methanol, and 15.9 ml of $H_2O_2$ were added thereto, followed by oxidation with agitation at 40° C. for a period of 15 hours.

After the reaction, water in an amount of four times of the one of the above THF was added to the derived reaction mixture while the mixture was agitated. The resultant white precipitate was filtered and recovered, followed by water washing.

The reaction conditions for each of the above-mentioned Experiments 1 to 5, the resultant introduction ratio of OH-group, and the resultant yield are summarized as shown Table 1.

TABLE 1

Relationship between Reaction Conditions, OH-group Introduction Ratio and Yield

| Exp. | Conc. (W/V %)[1] | Reaction Temp. (° C.) | Reaction Time (hrs) | Amount[2] of Added Reagent | OH-group Introd. Ratio (%)[3] | Yield (wt %) |
|---|---|---|---|---|---|---|
| 1 | 3 | 70 | 5 | 0.33 | 38 | 90 |
| 2 | 0.3 | 70 | 5 | 0.33 | 50 | 100 |
| 3 | 0.3 | 70 | 5 | 1 | 100 | 128[4] |
| 4 | 0.3 | 70 | 5 | 1 | 100 | 130 |
| 5 | 1 | 55 | 5 | 3 | 100 | 131 |

NOTE:
[1]The concentration of PBD as a raw material when PBD was charged for reaction.
[2]BTC in an amount of [(the number of moles of BTC)/(the number of moles of double bonds therein)], or 9BBN in an amount of [(the number of moles of 9BBN)/(the number of moles of double bonds therein)]was added.

TABLE 1-continued

Relationship between Reaction Conditions,
OH-group Introduction Ratio and Yield

| Exp. | Conc. (W/V %)[1] | Reaction Temp. (° C.) | Reaction Time (hrs) | Amount[2] of Added Reagent | OH-group Introd. Ratio (%)[3] | Yield (wt %) |
|------|------|------|------|------|------|------|

[3] The ratio of introduction of OH-group was determined from the ratio of the integrated intensity of [double-bond hydrogen near 5.4 ppm] to the integrated intensity of [hydrogen adjacent to hydroxyl group near 3.5 ppm, wherein the integrated intensity was measured by means of $^1$H-NMR. Incidentally, as a solvent for NMR, deuterated chloroform and deuterated methanol were used. Although a signal from the polymer and the one from the solvent do not overlapped eachother, merely the portion of the polymer as dissolved in the solvent was measured.
[4] The theoretical yield when OH-group is introduced therein in an amount of 100% is 133.3 wt. %.

With respect to the solubility of the 1,4-polybutadiene as a raw material, as summarized in the following Table 2, the 1,4-polybutadiene was satisfactorily dissolved in a solvent such as tetrahydrofuran, toluene or chloroform, while it was insoluble in methanol. On the other hand, the resultant ethylene-vinyl alcohol copolymer indicated the reverse solubility thereto.

Incidentally, although a cisPBD-OH(BTC) and a cisPBD-OH(9BBN) are an ethylene-vinyl alcohol copolymer, there was the difference therebetween that the cisPBD-OH(BTC) was swelled with methanol while the cisPBD-OH(9BBN) was dissolved in an amount of approximately 1 w/v %. That is, when the sort of a hydroboration reagent was different, the solubility of the resultant copolymer was different.

TABLE 2

Soluble Solvent (◯) and Insoluble Solvent (X)

| | THF | Toluene | n-hexane | Chloroform | Water | Methanol |
|---|---|---|---|---|---|---|
| cisPBD | ◯ | ◯ | ◯ | ◯ | X | X |
| cisPBD-OH (BTC) | X | X | X | X | X | Δ (Swelling) |
| cisPBD-OH (9BBN) | X | X | X | X | X | ◯ |

(Structural Analysis and Physical Properties Evaluation)

The structure and physical properties of an ethylene-vinyl alcohol copolymer of the present invention were determined by a spectroscopic measurement by means of $^1$H-NMR, $^{13}$C-NMR, IR or the like, and by a thermal analysis by means of DMA, DSC, TG or the like.

Figure 1:
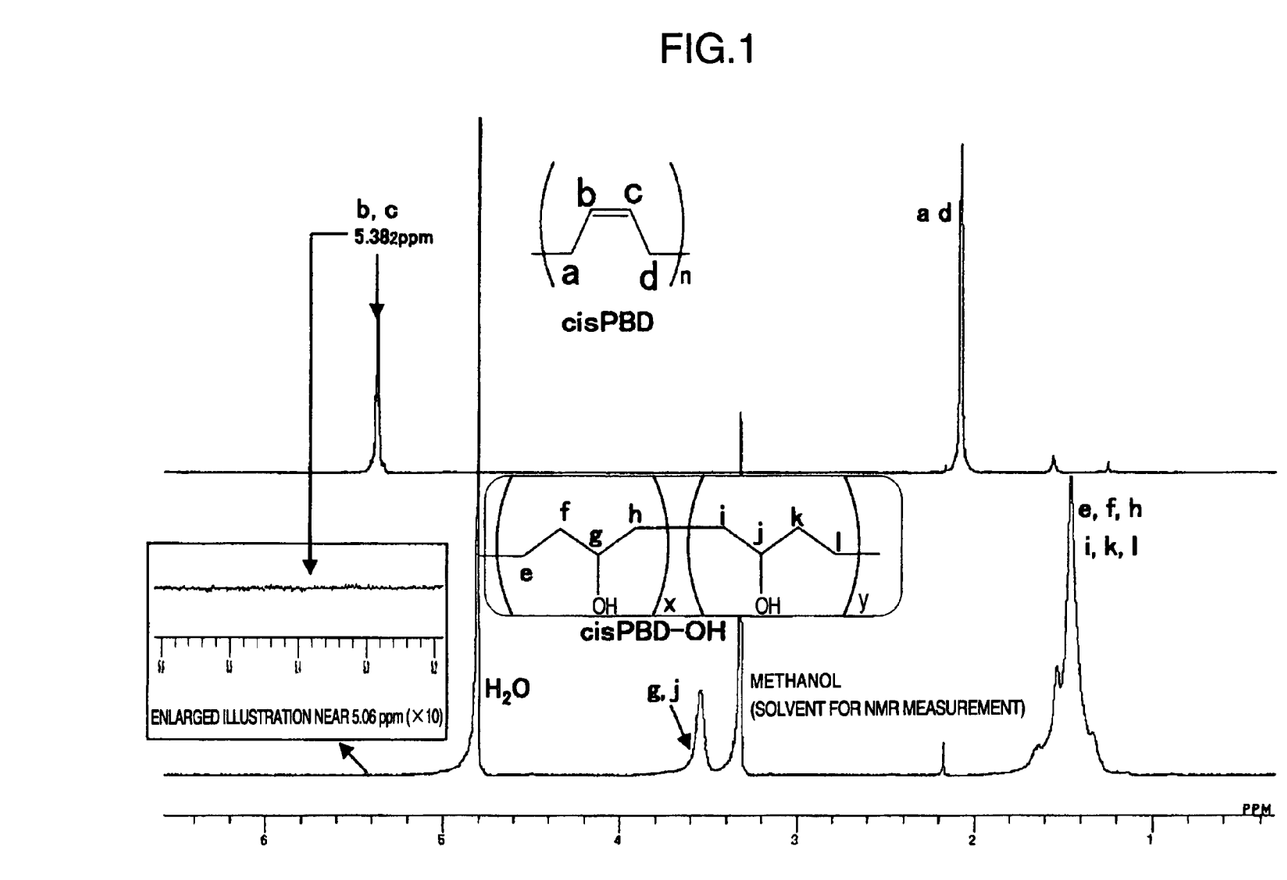
FIG. 1 illustrates $^1$H-NMR data of each of cisPBD and cisPBD-OH(9BBN)

In FIG. 1, the result of $^1$H-NMR measurements of each of the cisPBD and a cisPBD-OH(9BBN) derived therefrom is shown. Based upon the fact that from the attribution of hydrogen atoms of "a" to "l", "b" and "c" each of which is an olefinic-hydrogen atom are completely vanished, and hydrogen atoms of "g" and "j" newly appear, it is found that double bonds therein are approximately completely hydroxylated.

Figure 2:
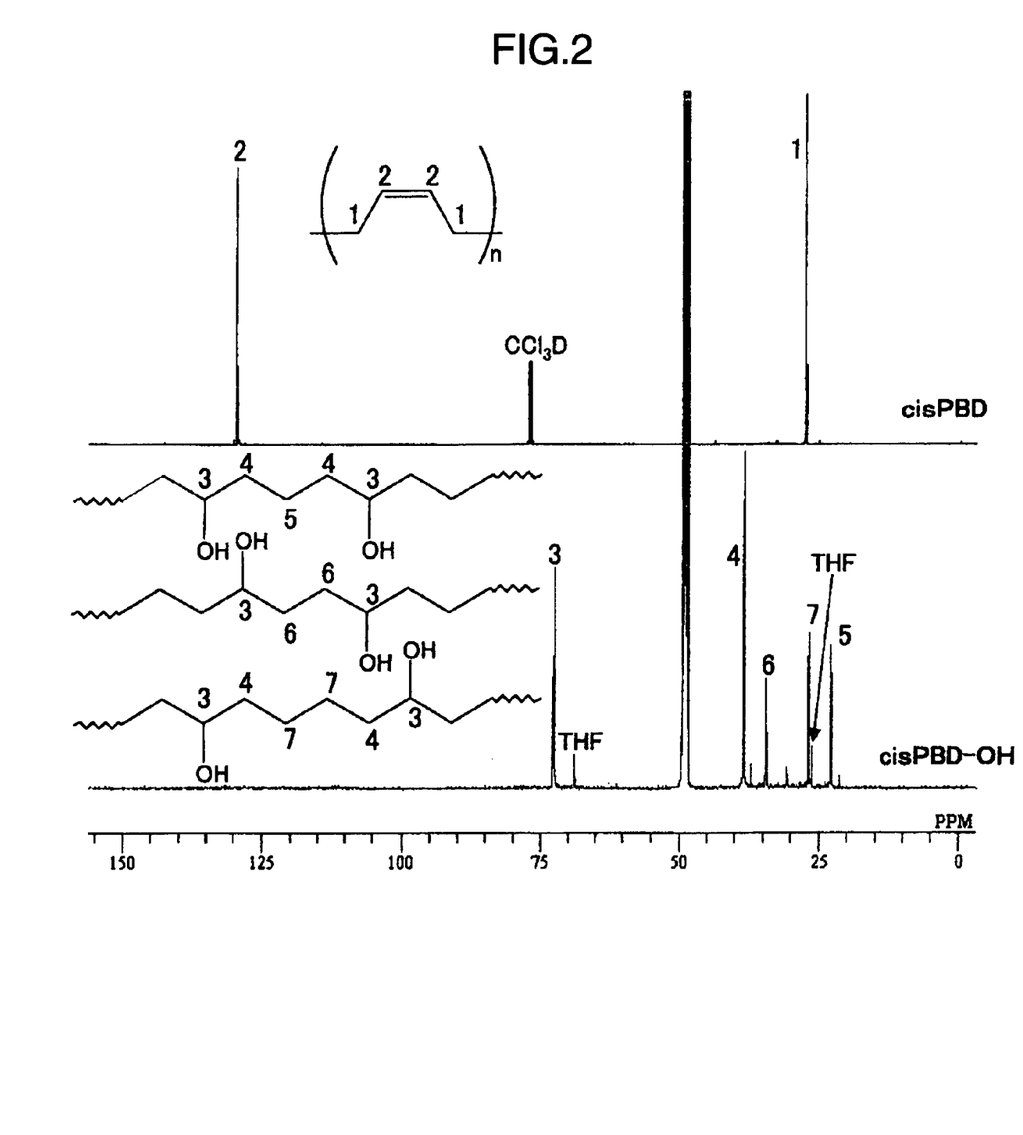
FIG. 2 illustrates $^{13}$C-NMR data of each of cisPBD and cisPBD-OH(9BBN)

In FIG. 2, the result of $^{13}$C-NMR measurements of each of the cisPBD and a cisPBD-OH(9BBN) derived therefrom is shown.

Figure 3:
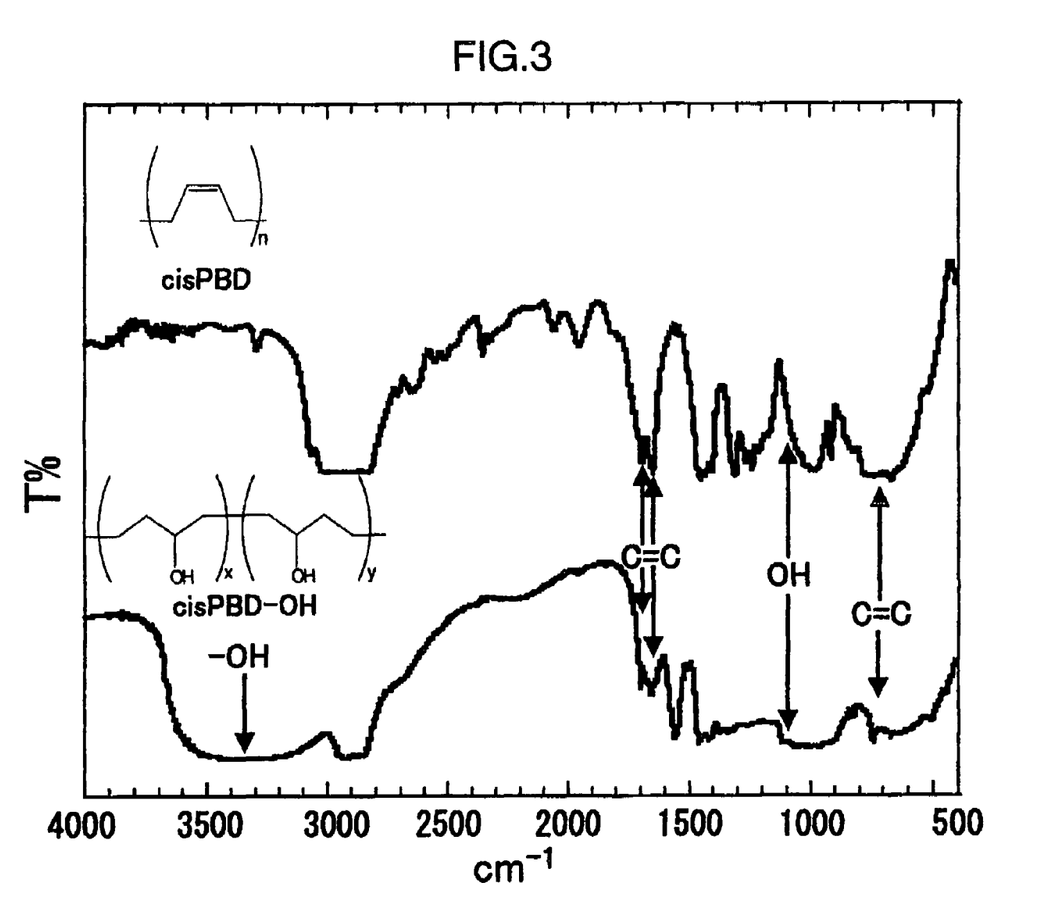
FIG. 3 illustrates IR data of each of cisPBD and cisPBD-OH(BTC)

In FIG. 3, the result of IR measurements of each of the cisPBD and a cisPBD-OH(BCT) derived therefrom is shown. From these results, it is found that the peak of each of =C—H and C=C having double-bond properties is vanished, and in return the peak of OH-group appears.

Figure 4:
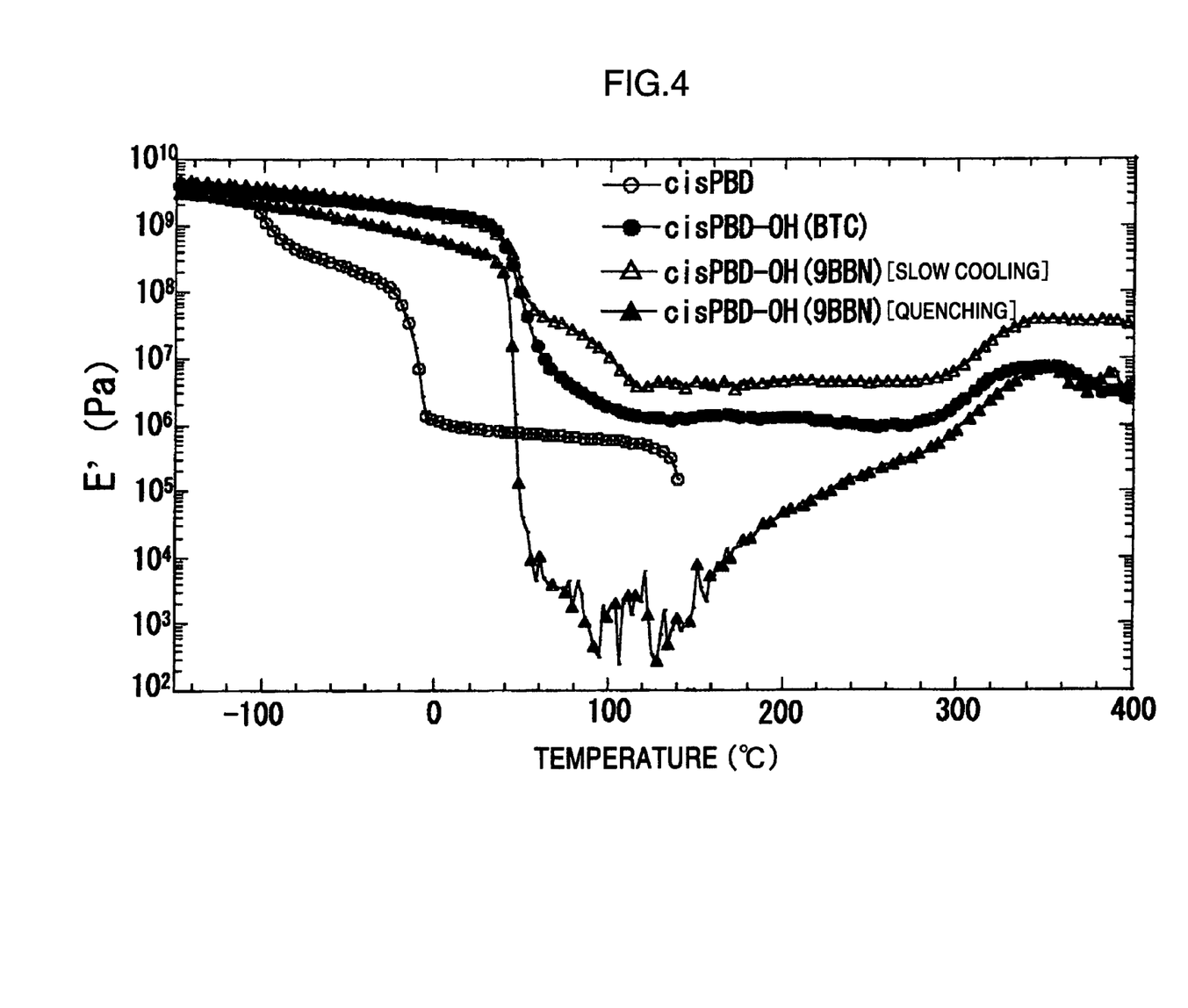
FIG. 4 illustrates a DMA-curve (E') of each of cisPBD, cisPBD-OH(BTC), cisPBD-OH(9BBN) [slow cooling], and cisPBD-OH(9BBN) [quenching]

In FIG. 4, a DMA-curve from each of the cisPBD and cisPBD-OH is shown. In the DMA-curve of each of the cisPBD-OH, the decrease of the storage elastic modulus (E') near each of −110° C. and −20° C., which was observed in the curve of the cisPBD, was vanished, while the (E') was decreased from near 40° C. A decrease in E' near each of −110° C. and −20° C., which was observed in the curve of the cisPBD, corresponds to the glass-transition temperature "$T_g$" and the melting temperature "$T_m$". Thus it is found that the viscoelasticity is remarkably changed due to hydroxylation. The E' with rubber-like elasticity was increased due to hydroxylation so as to be shifted to the high-temperature side. The E' of each of the cisPBD-OH is characterized in that it is increased from near 280° C., and its peak appears near 340° C. With respect to the cisPBD-OH(BTC), the cisPBD-OH(9BBN) [slow cooling] and the cisPBD-OH (9BBN) [quenching], each of which is a cisPBD-OH, the individual E's with rubber-like elasticity were different from each other. That is, it is found that the viscoelasticity is remarkably changed due to a hydroboration reagent and molding conditions as used.

Figure 5:
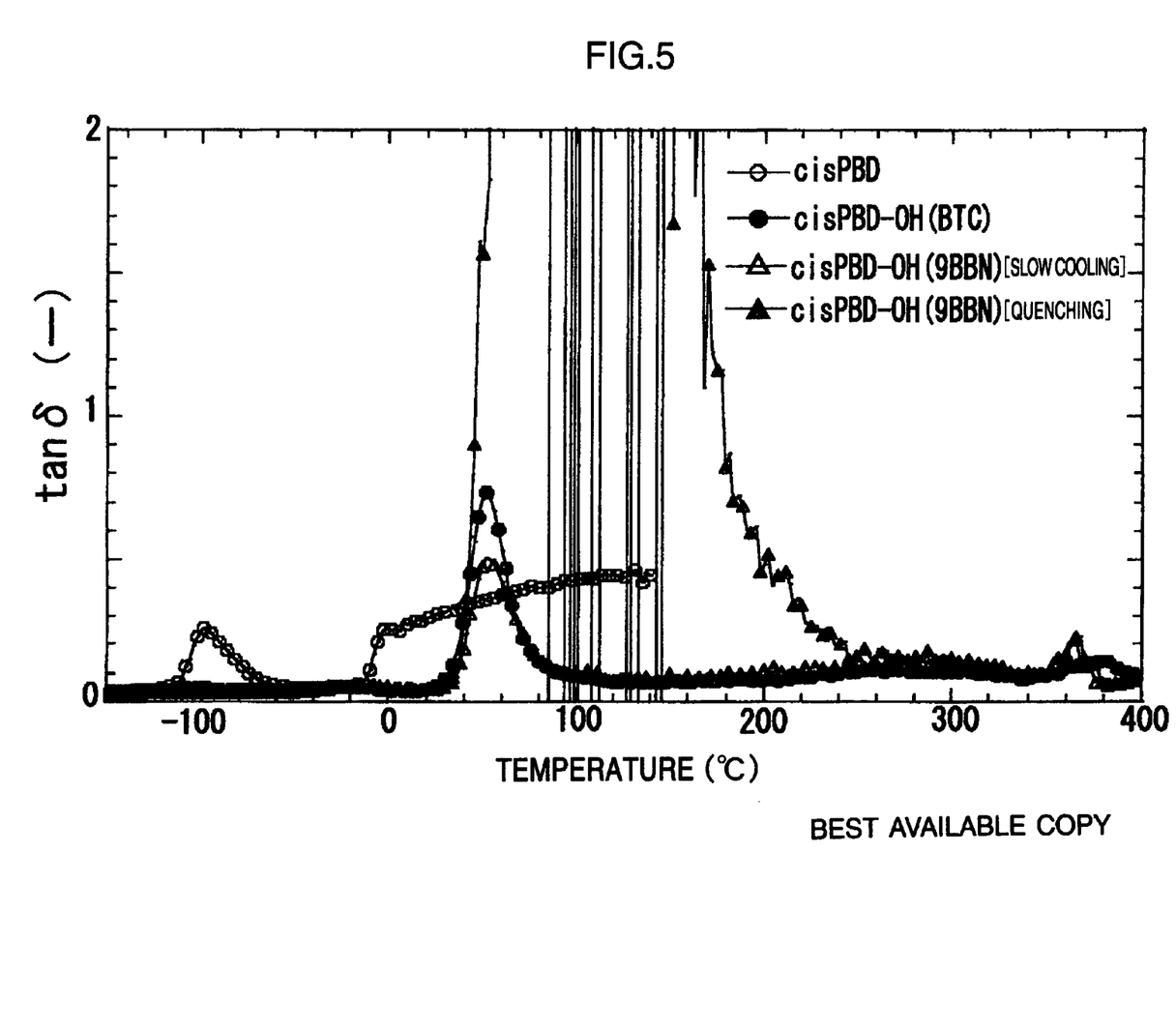
FIG. 5 illustrates a DMA-curve (tan δ) of each of cisPBD, cisPBD-OH(BTC), cisPBD-OH(9BBN) [slow cooling], and cisPBD-OH(9BBN) [quenching]

In FIG. 5, the profiles of tan δ as determined by means of DMA under the same conditions as the ones in FIG. 4 are shown, from which it is confirmed that the $T_g$ is shifted from near −100° C. to near 50° C. with remarkable changes.

Figure 6:
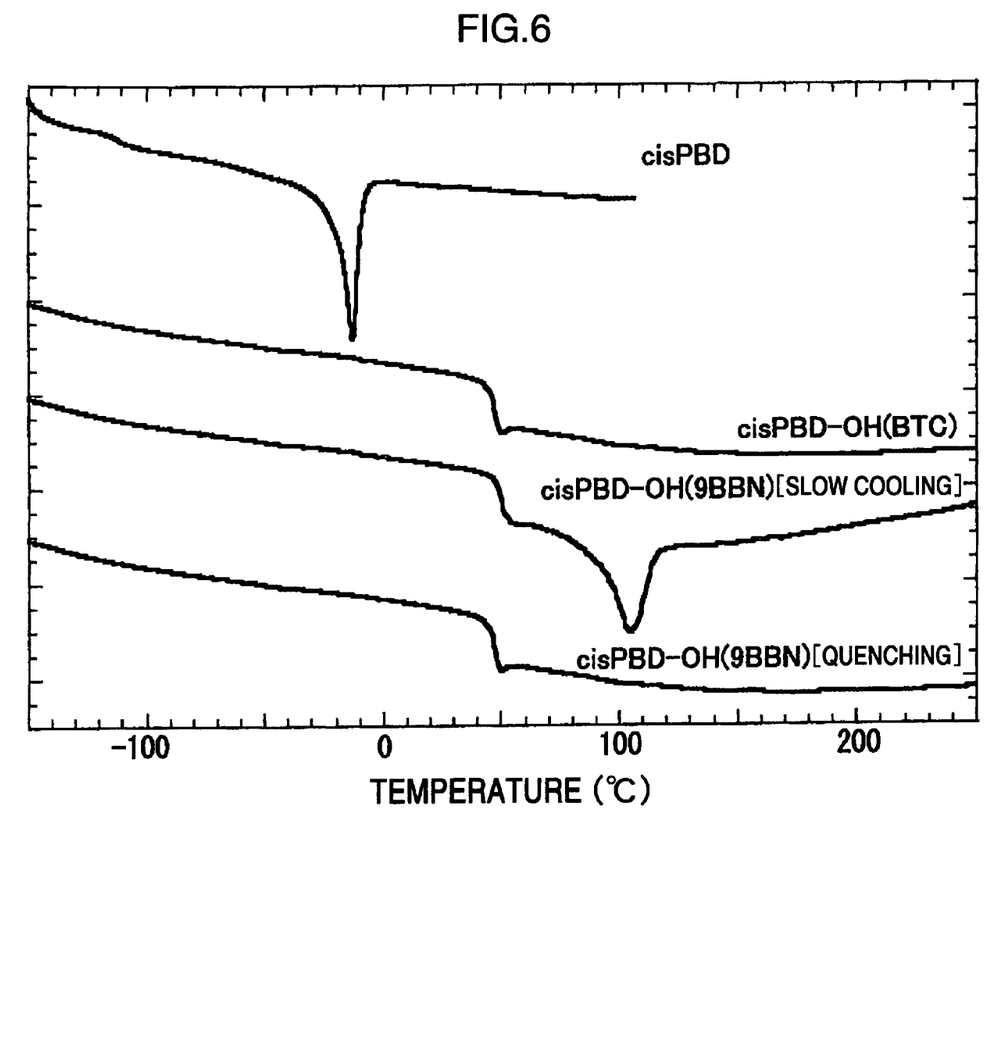
FIG. 6 illustrates a DSC-curve of each of cisPBD, cisPBD-OH(BTC), cisPBD-OH(9BBN) [slow cooling], and cisPBD-OH(9BBN) [quenching]

In FIG. 6, a DSC-curve of each of the cisPBD and the cisPBD-OH was shown. In the curve of each of the cisPBD-OH, the $T_m$ of each of the cisPBD-OH is vanished in a similar way to the one by means of DMA, the $T_g$ is shifted to the high-temperature side. With respect to the cisPBD-OH(9BBN) [slow cooling] and the cisPBD-OH(9BBN) [quenching], each of which is a cisPBD-OH, the individual DSC-curves were different from each other. A signal near 100° C. of the cisPBD-OH(9BBN) [slow cooling] is considered to be caused due to crystallization. That is, it is considered that when the cisPBD-OH(9BBN) was molded, followed by quenching, the crystallization is not caused, but in case of slow cooling, the crystallization is progressed.

Figure 7:
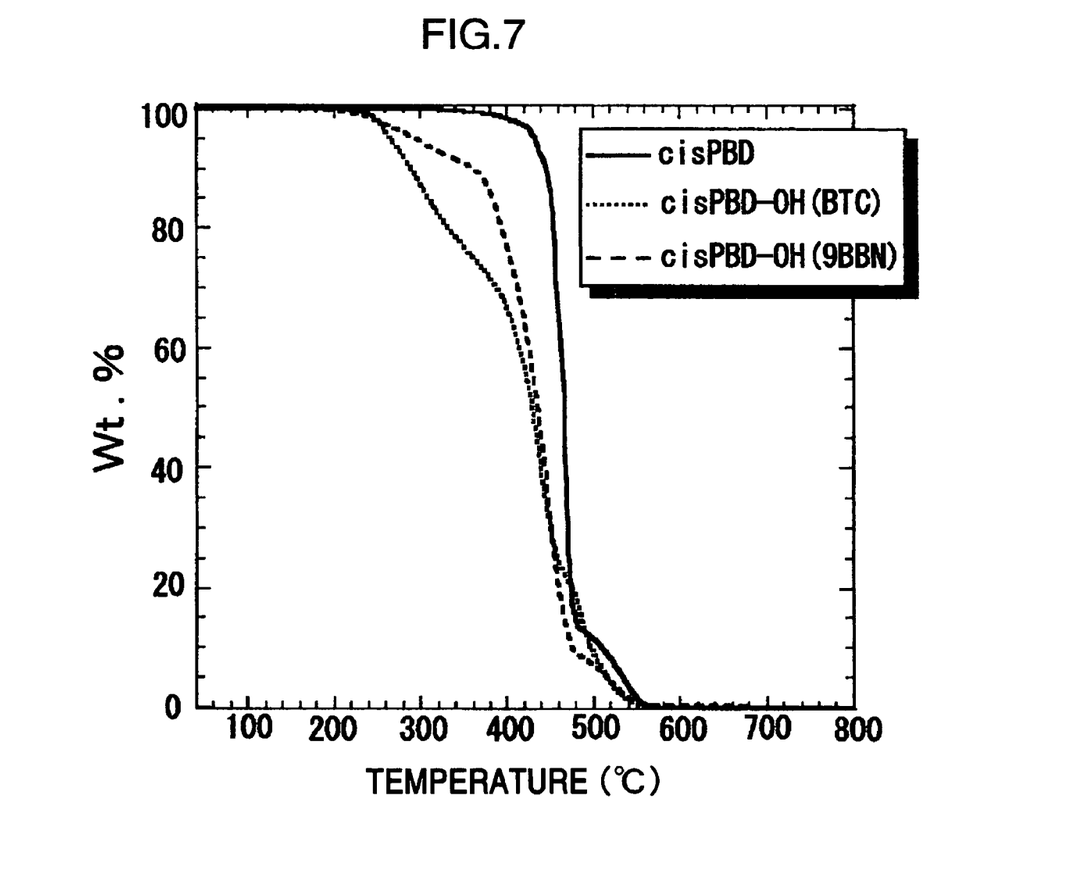
FIG. 7 illustrates a TG-curve (in an atmosphere of air) of each of cisPBD, cisPBD-OH(BTC), and cisPBD-OH(9BBN)
Figure 8:
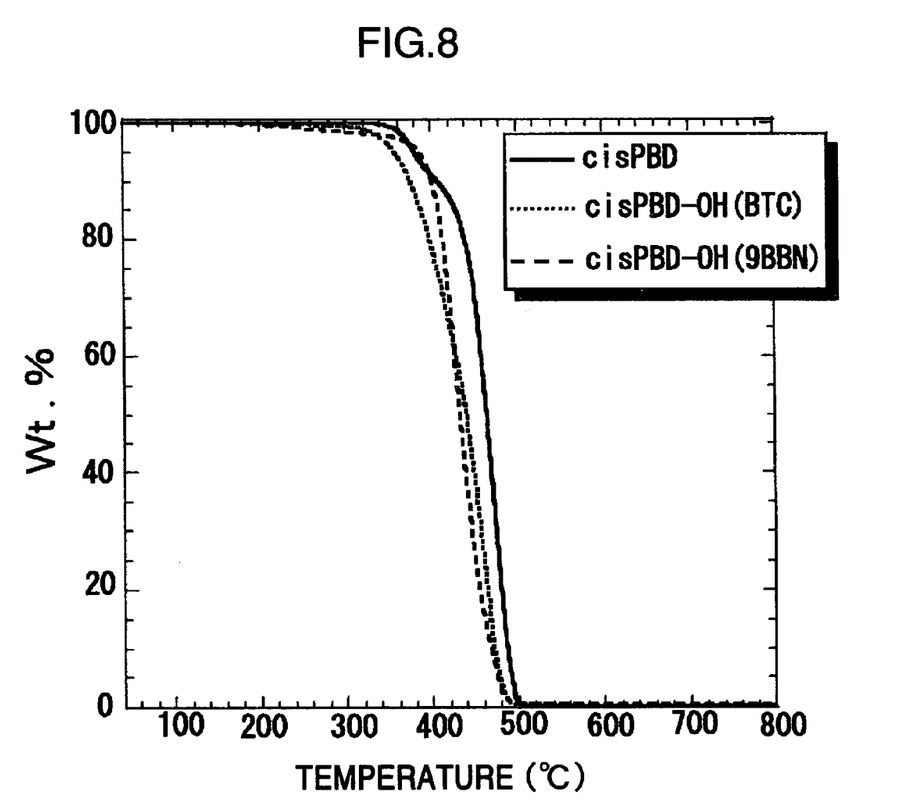
FIG. 8 illustrates a TG-curve (in an atmosphere of nitrogen) of each of cisPBD, cisPBD-OH(BTC), and cisPBD-OH(9BBN)

In each of FIGS. 7 and 8, a TG-curve of each of the cisPBD and the cisPBD-OH is shown. According to the curves from an atmosphere of air, each of the cisPBD-OH starts to decrease from near 200° C., and loses its weight in an amount of about 25% therefrom to 400° C. This indicates that the dehydration and desorption of hydroxyl group have been approximately completely progressed, which corresponds to information from the DMA-curves in FIG. 4.

Figure 9:
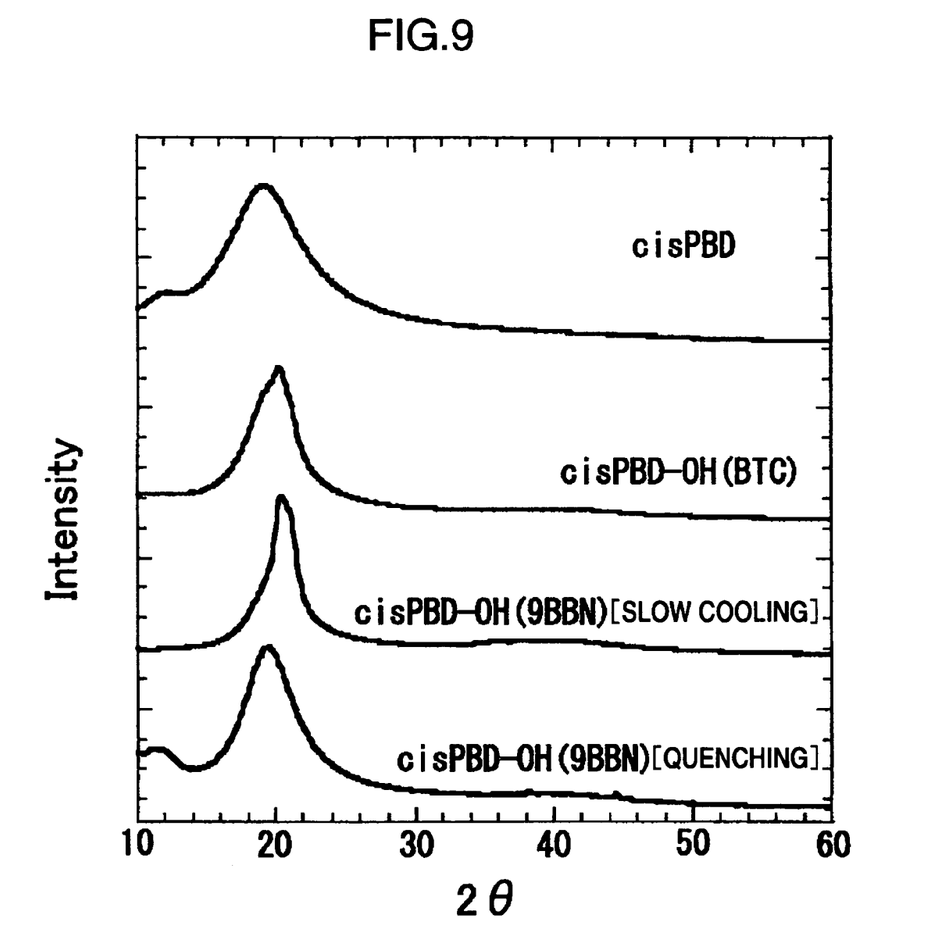
FIG. 9 illustrates the result of a wide-angle X-ray diffraction of each of cisPBD, cisPBD-OH(BTC), cisPBD-OH(9BBN) [slow cooling], and cisPBD-OH(9BBN) [quenching]

In FIG. 9, the result of a wide-angle X-ray diffraction of each of the cisPBD and the cisPBD-OH is shown. It is found that each of the cisPBD-OH is amorphous as well as the cisPBD. However, the signal of the cisPBD-OH(9BBN) [slow cooling] is sharper than that of the cisPBD-OH (9BBN) [quenching], which suggests that the crystallization is caused in a degree.

Figure 10:
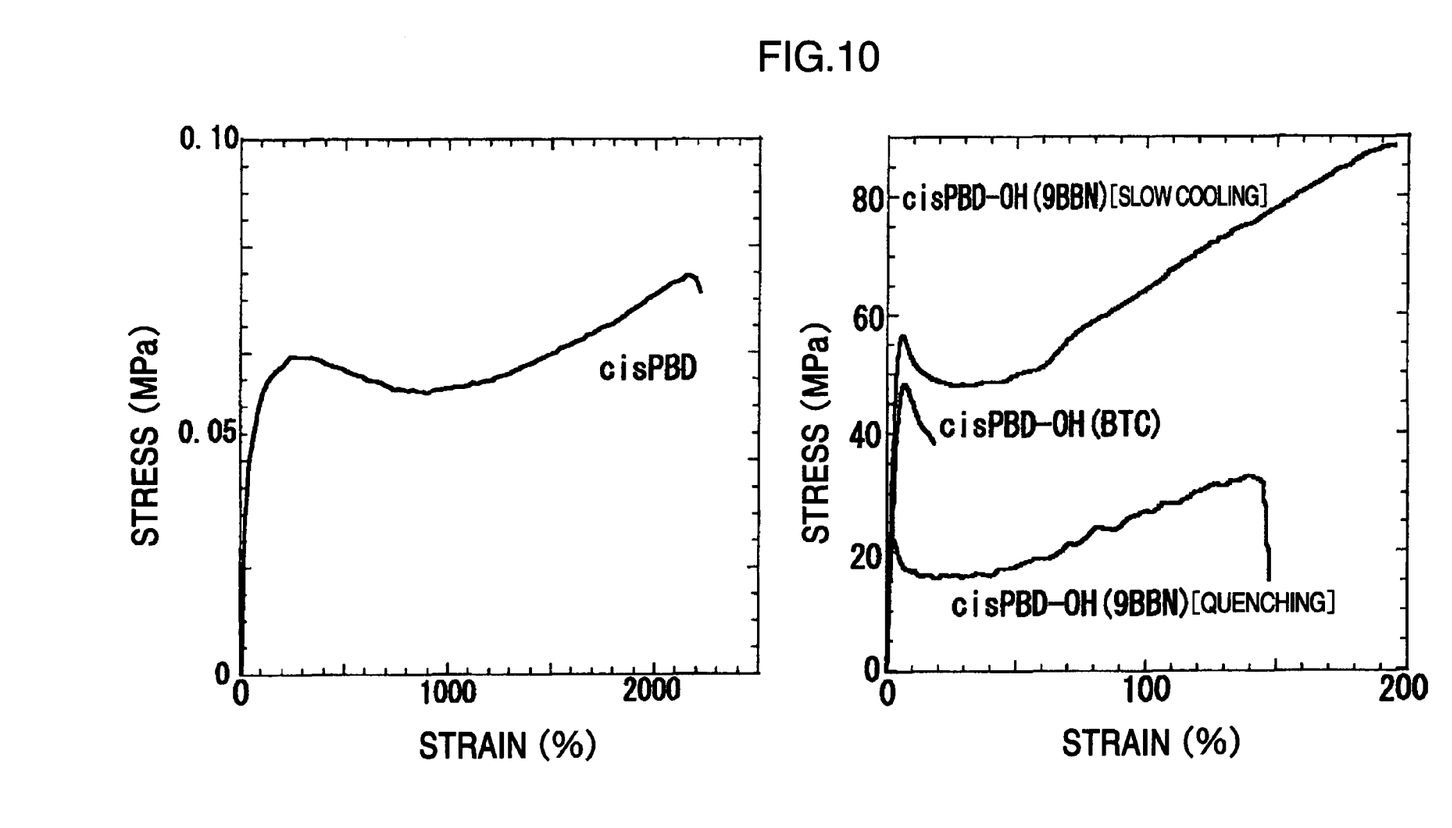
FIG. 10 illustrates the result of a stress-strain test of each of cisPBD, cisPBD-OH(BTC), cisPBD-OH(9BBN) [slow cooling], and cisPBD-OH(9BBN) [quenching].

In FIG. 10, the result of the stress-strain test of each of the cisPBD and the cisPBD-OH is shown. It is found that the cisPBD and the cisPBD-OH are remarkably different in tensile characteristics from each other. Each of the cisPBD-

OH is remarkably improved in tensile strength as compared with the cisPBD, while decreased in tensile elongation.

INDUSTRIAL APPLICABILITY

According to a method with respect to the present invention, an 1,4-polybutadiene can be approximately completely hydroxylated, whereby a ethylene-vinyl alcohol alternating copolymer having a novel structure. The ethyene-vinyl alcohol alternating copolymer of the present invention is excellent in tensile properties, and can be used as a fiber and the like.

The invention claimed is:

1. An ethylene-vinyl alcohol copolymer, represented by the formula (1):

(1)

wherein n represents a number in the range of 15 to 15,000.

2. An ethylene-vinyl alcohol copolymer according to claim 1, wherein said copolymer is derived by hydroxylating a cis-1,4-polybutadiene.

3. An ethylene-vinyl alcohol copolymer according to claim 1, wherein said copolymer is derived by hydroxylating a trans-1,4-polybutadiene.

4. A method of producing an ethylene-vinyl alcohol copolymer, wherein an 1,4-polybutadiene is hydroborated in non-gel state in a solvent, followed by oxidation to be hydroxylated so as to derive an ethylene-vinyl alcohol copolymer represented by the formula (1):

(1)

wherein n represents a number in the range of 15 to 15,000.

5. An ethylene-vinyl alcohol copolymer according to claim 1, wherein said copolymer is derived by hydroxylating at least 99 mole % of double bonds of 1,4-polybutadiene.

* * * * *